Nov. 17, 1936.  N. C. CAHOON  2,060,796
DRY CELL
Original Filed June 17, 1931

INVENTOR:
Nelson C. Cahoon,
BY ATTORNEYS
Byrnes Townsend & Potter.

Patented Nov. 17, 1936

2,060,796

UNITED STATES PATENT OFFICE 2,060,796

DRY CELL

Nelson C. Cahoon, Fremont, Ohio, assignor to Union Carbide and Carbon Corporation, a corporation of New York Application June 17, 1931, Serial No. 545,119
Renewed March 4, 1936

18 Claims. (Cl. 136—133)

This invention relates to dry cells and particularly to improved means for closing and sealing such cells.

In the manufacture of dry cells it has been common practice to close the cell by placing a layer of sand over the top of the mix body and then pouring a layer of sealing compound over the sand. This type of closure is not altogether satisfactory and recently it has been proposed to use a metal cover or closure for dry cells. Cells with metal closures have various advantages such as increased space for active material, less liability to breakage during handling and shipment, and lightness. Improved venting properties are also secured with cells of this type. Cells with metal closures in the past have had the closure insulated from only one of the electrodes, usually the central carbon electrode. In my improved construction the metal closure is insulated both from the central electrode and outer electrode, such as the zinc can. This has the advantages that if the wire leading from the central connection touches the closure there is no danger of accidental short circuit. Cells embodying my invention comprise an insulating gasket which provides a water- and gas-tight joint at the rolled seam at the junction between the zinc can and the metal closure. The insulating gasket also serves to protect the underside of the metal closure from electrolytic action due to contact with the active material within the dry cell. Furthermore, by extending the insulating gasket far enough inwardly, it is possible to dispense with the insulating washer heretofore required on the top of the central carbon electrode.

An object of my invention is to provide a metal-sealed dry cell in which the danger of short circuit is minimized. Another object of my invention is to form a tight joint between the metal closure and the zinc can. These and other objects of my invention will be evident from the following specification having reference to the accompanying drawing in which.

Figure 1:
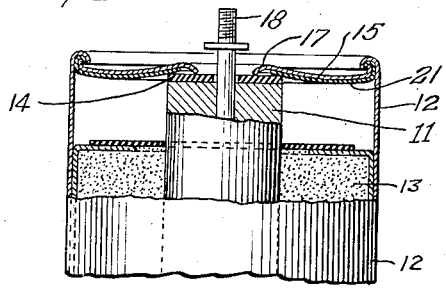
Fig. 1 is a vertical cross section through the top of a cell illustrating one embodiment of my invention.
Figure 2:
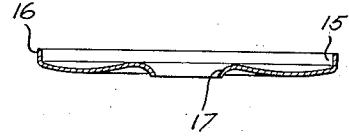
Fig. 2 is a cross section of the metal closure.
Figure 3:
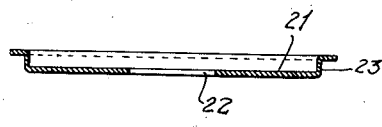
Fig. 3 is a cross section of the insulating gasket before assembly.

In the embodiment illustrated in Figures 1 to 4 inclusive a dry cell is shown consisting of a central carbon electrode 11, an outer cylindrical zinc can or container 12 forming the other electrode, with the usual or any preferred electrolyte and depolarizing mix or active material 13 between the electrodes. An annular insulating washer 14 rests upon or is supported by the top of the carbon electrode. A metal closure or cover 15 is placed within the can with its inner edge or margin engaging the insulating washer 14. This improved closure comprises an annular sealing member or cover of relatively thin resilient metal, such as sheet steel from about 0.01 to 0.03 inch thick, having an upturned flange 16 at its outer edge, fitting within the upper rim of the zinc can 12. The cover preferably has a downturned flange 17 at its inner edge adapted to press tightly against the insulating washer 14 which may be of paper, rubber, fibre or similar material. A metal dowel 18 imbedded in and extending upward from the center of the electrode 11 projects through an opening in the washer 14 to hold it in position and to serve as the central terminal of the cell.

Figure 4:
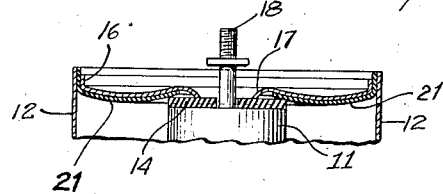
Fig. 4 is a cross section of a cell after the parts are assembled in place but before the edge of the can is rolled over forming the joint between the can and closure.

A separately-formed annular insulating body or gasket 21 having central opening 22 and outer flange 23 is provided. The body or gasket is non-conductive to electricity and electrolyte, and may be preformed of a sheet of paper, fibre or other electrically insulating material, which may be waterproofed to further prevent penetration by the electrolyte. During assembly the insulating gasket is placed on the cell in such a manner that the depressed central portion fits inside the can, the outer edge of the gasket resting on the top edge of the can. The metal cover 15 is placed on top of the insulating gasket 21 and pressed into the can until the central parts of the cover and gasket rest on the insulating washer 14. This action draws the outer margin of the insulating gasket into the can as shown in Figure 4; then the upright edges of the zinc can and insulating gasket are together rolled over the edge of the metal cover 15 thus permanently securing the outer margins or peripheries of the cover and gasket to the upper end of the can and completely insulating the cover from the can as most clearly shown in Figure 1.

Figure 5:
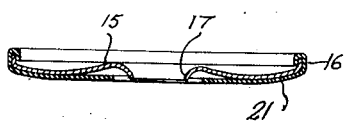
Fig. 5 is a cross section of the cover and insulating gasket prepared for another method of assembly.

To facilitate assembly the cover and gasket may be secured together before placing them in the can. In this method of assembly the gasket and cover are placed together with the gasket contracting the inner surface of the cover, and the outer edge of the gasket is curled over the outer edge 16 of the cover, as shown in Fig. 5. This sub-assembly is then placed in the can with the down-turned flange 17 resting on the insulating washer 14 and the top edge of the can is then rolled over the top of the upturned flange 16, over which the gasket has been previously curled, thereby rigidly and permanently securing the outer peripheries or margins of the cover and the gasket to the zinc can.

Figure 6:
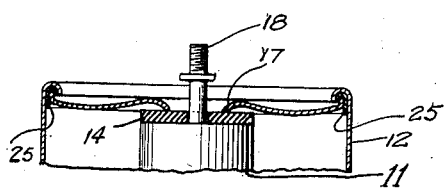

The central portion of the gasket bears against and is held between the top of the insulating washer and the underside of the metal cover and serves to protect the lower side of the cover from the electrolytic action. As shown, the inner margins of both the cover and the gasket extend inwardly of the periphery of the electrode 11. However, it should be understood that it is not essential that the gasket extend entirely to the washer 14 or to the electrode 11 to electrically insulate the cover from the can, since I may employ a much smaller gasket as shown in Figure 6 in which 25 is a modified gasket which does not extend to the central electrode. In this case the method of assembly in which the gasket is attached to the cover before they are secured to the can is preferable. However, under most conditions I prefer to have the gasket extend to the central electrode as shown in Figures 1, 4 and 7, so that the cover will be insulated from both electrodes and its entire interior surface will be protected against contact with the electrolyte or active material within the cell.

Figure 7:
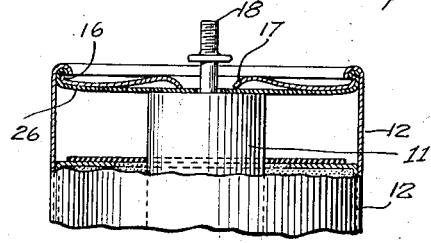
Figs. 6 and 7 are cross sections of modifications illustrating other embodiments of my invention.

I may provide a gasket 26 extending beyond the inner edge of the metal cover as shown in Figure 7, so that the inner margin of the sheet or gasket extends closer to the axis of the electrode 11 than the inner margin of the cover in which case the insulating washer may be omitted.

It will be apparent that in case a gas pressure is built up during the life of the cell the metal cover and the gasket are raised and escape of the gas is permitted. When the excess gas has been released the natural resiliency of the metal cover again closes this passage. Normal venting may occur through the electrode 11 and around the dowel.

Thus it will be evident that I have provided a dry cell having a metal cover in which the latter is electrically insulated from one, and preferably from both electrodes, so that there is less possibility of short circuit due to contact between the terminals of the cell and the metal cover, in which a tight permanent joint between the cover and can is secured; and in which the underside of the cover is protected against electrolytic action resulting from contact of electrolyte and active material with both the sheet steel cover and the zinc can, which would otherwise form an electromotive couple, causing local action and reducing the life of the cell.

I claim:

1. A dry cell comprising a zinc container, a carbon electrode therein, an annular metal closure having its outer edge secured to the upper end of said container and having its inner edge extending inwardly of the periphery of said electrode, and an insulating gasket having its outer edge secured between said closure and said container and its inner edge extending inwardly of the outer periphery of said electrode.

2. A dry cell comprising a container forming an outer electrode, a central electrode therein, an insulating washer carried by the upper end of said central electrode, an annular metallic closure having its outer edge secured to the upper end of said container and having its inner edge normally contacting with said washer, and an insulating gasket having its outer edge secured between the outer edge of the closure and the container and having its inner edge held between the closure and the washer.

3. A dry cell comprising a zinc container, a carbon electrode therein, an insulating washer carried by said electrode, an annular sheet metal closure having its outer edge permanently secured to the upper end of said container and its inner edge normally contacting with said washer, and a waterproof gasket disposed in the joint between the container and the closure and extending to said electrode.

4. A dry cell comprising a zinc container electrode; a carbon electrode therein; a closure for the opening between said electrodes comprising an annular resilient metal cover having the outer edge thereof secured to said zinc container and the inner edge exerting resilient pressure on said carbon electrode, and preformed annular sheet means for insulating said cover from both of said electrodes.

5. A dry cell comprising a zinc container; a carbon electrode therein; a closure for said cell comprising an annular metal cover having an upturned flange at the outer edge thereof permanently secured to the upper end of said zinc container and a downturned flange at the inner edge thereof adapted to exert a pressure upon the upper end of said carbon electrode; and preformed continuous means for insulating said cover both from said zinc container and said carbon electrode.

6. In a dry cell having an outer electrode surrounding an inner electrode, a closure for said cell comprising an annular sheet metal cover having the outer margin thereof permanently secured to the upper edge of said outer electrode and the inner margin thereof forming a substantially gas-tight joint with said inner electrode, and a gasket of electrically non-conductive material having the outer margin thereof secured in the joint between the upper edge of said outer electrode and the outer margin of said cover and the inner margin thereof in the joint between the inner margin of said cover and said inner electrode, thereby insulating said cover from both of said electrodes.

7. In a dry cell having an outer container electrode, an inner electrode within said outer electrode, and a metal cover; means for electrically insulating said cover from both of said electrodes comprising an annular member of non-conductive material covering the inner surface of said cover and having the outer margin thereof secured to the upper edge of said outer electrode together with the outer margin of said cover, and the inner margin thereof secured between the inner margin of said cover and said inner electrode.

8. In a dry cell having an outer electrode substantially enclosing an inner electrode; a closure for said cell comprising an annular cover of sheet metal having the outer margin thereof forming a permanent joint with said outer electrode and the inner margin thereof forming a joint with said inner electrode, and means for insulating said cover from both of said electrodes comprising an annular sheet of non-conductive material having the outer margin thereof in the joint between said cover and said outer electrode, and the inner margin thereof in the joint between said cover and said inner electrode.

9. In a dry cell, the combination of an outer container electrode, an inner electrode, an electrolyte within said container electrode, a closure for said cell comprising a metal that will form an electromotive couple with said outer electrode, and preformed annular sheet means for insulating said closure from both of said electrodes and also protecting said closure from contact with said electrolyte.

10. In a dry cell having an outer container electrode, an inner electrode therein, and an electrolyte within said container electrode; a closure for said cell comprising an annular metal cover having one margin thereof secured to one of said electrodes and the other margin thereof forming a substantially gas-tight joint with the other of said electrodes, and means for protecting said cover from contact with said electrolyte and said electrodes comprising an annular sheet of non-conductive material overlying the surface of said cover within said cell and the margins of said cover and the edges of said cover within said joint.

11. A dry cell comprising a container electrode; an electrode member within and spaced from said container electrode; active material in the space between such electrodes; a closure for the cell comprising a metal cover member having one margin thereof secured to said container electrode and having another margin thereof bearing against said electrode member; and a body of insulating material formed independently of said metal cover member and secured against and covering the interior surface of said cover member.

12. A dry cell comprising a cylindrical container electrode; an electrode member within and spaced from said container electrode; active material in the space between such electrodes; a closure for the cell comprising an annular metal cover having its outer margin permanently secured to said container electrode and having its inner margin supported by said electrode member; and an annular body of waterproof and electrically non-conductive material formed independently of said metal cover and secured against and completely covering the interior surface of said cover.

13. A dry cell as claimed in claim 12, in which a washer of insulating material is disposed between said electrode member and the inner margin of said cover.

14. A dry cell comprising a cylindrical container electrode; an electrode member within and spaced from said container electrode; active material in the space between said container electrode and said electrode member; a closure for the cell comprising an annular metal cover having its outer margin permanently secured to said container electrode and having its inner margin supported by said electrode member; and a separately-formed annular body of waterproof and electrically non-conductive material secured against and covering the interior surface of said cover; the inner margin of said separately-formed annular body being disposed closer to the axis of said electrode member than the inner margin of said annular metal cover.

15. A dry cell comprising a container electrode; an electrode member within and spaced from said container electrode; active material in the space between such electrodes; a closure for the cell comprising a metal cover; and a sheet of electrical insulating material between said cover and said container electrode, the outer margins of said cover and said sheet being permanently secured to said container electrode.

16. A dry cell comprising a cylindrical container electrode; an electrode member within and spaced from said container electrode; active material in the space between such electrodes; a closure for the cell comprising an annular metal cover; and a pre-formed annular sheet of electrical insulating material contacting with and completely covering the interior surface of said cover, the outer margins of said cover and said sheet being secured to the top end of said container electrode and the inner margins of said cover and said sheet being supported by said electrode member.

17. A dry cell comprising a cylindrical zinc container electrode; an electrode member centrally within and spaced from said container electrode; active material in the space between such electrodes; a closure for the cell comprising an annular sheet metal cover; and an annular sheet of waterproof and electrical insulating material contacting with and completely covering the inner surface of said cover and electrically insulating said cover from both of said electrodes, the outer margins of said cover and said sheet of waterproof insulating material being permanently secured to the top end of said container electrode and the inner margins of said cover and said sheet of waterproof insulating material being supported by said electrode member, the inner edge of said sheet of waterproof insulating material being disposed closer to the axis of said electrode member than the inner edge of said cover.

18. A dry cell comprising a container electrode; an electrode member within and spaced from said container electrode; active material in the space between such electrodes; a closure for the cell comprising a metal cover member having one margin thereof secured to said container electrode and having another margin thereof supported by said electrode member; and a body of insulating material permanently secured against the interior surface of said cover member during assembly of the said container electrode and said cover member, the said insulating material covering the said surface.

NELSON C. CAHOON.